US006959223B2

(12) United States Patent
Ogasawara et al.

(10) Patent No.: US 6,959,223 B2
(45) Date of Patent: Oct. 25, 2005

(54) SYSTEM FOR MANUFACTURING A CUSTOMIZED METER

(75) Inventors: Masaaki Ogasawara, Shizuoka (JP); Masahiro Muramatsu, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 200 days.

(21) Appl. No.: 10/247,682

(22) Filed: Sep. 20, 2002

(65) Prior Publication Data
US 2003/0060912 A1     Mar. 27, 2003

(30) Foreign Application Priority Data
Sep. 21, 2001  (JP) ............................. 2001-289339

(51) Int. Cl.⁷ ............................................. G06F 19/00
(52) U.S. Cl. ..................................................... 700/97
(58) Field of Search .......................... 700/95–98, 105; 703/13; 705/26, 27; 73/866.3

(56) References Cited

U.S. PATENT DOCUMENTS

| | | | |
|---|---|---|---|
| 5,001,420 A * | 3/1991 | Germer et al. | 324/142 |
| 5,260,883 A * | 11/1993 | Wilson | 703/1 |
| 5,966,310 A * | 10/1999 | Maeda et al. | 707/104.1 |
| 6,201,769 B1 * | 3/2001 | Lewis | 368/10 |
| 6,230,066 B1 * | 5/2001 | Sferro et al. | 700/104 |
| 6,236,901 B1 * | 5/2001 | Goss | 700/95 |
| 6,249,714 B1 * | 6/2001 | Hocaoglu et al. | 700/97 |
| 6,473,666 B1 * | 10/2002 | Samura | 700/117 |
| 6,564,112 B1 * | 5/2003 | Factor | 700/97 |
| 2002/0120521 A1 * | 8/2002 | Forth et al. | 705/26 |
| 2003/0109949 A1 * | 6/2003 | Ikeda et al. | 700/98 |
| 2003/0230154 A1 * | 12/2003 | Ayres | 73/866.3 |

FOREIGN PATENT DOCUMENTS

| | | | |
|---|---|---|---|
| EP | 0990962 A1 * | 4/2000 | |
| EP | 1 020 807 | 7/2000 | |
| JP | 8-30674 | 2/1996 | |
| JP | 11-305650 | 11/1999 | |
| JP | 2002-063589 A * | 2/2002 | |
| JP | 2002-109306 A * | 4/2002 | |
| WO | 98/15908 | 4/1998 | |
| WO | WO 99/56183 A1 * | 11/1999 | |

* cited by examiner

Primary Examiner—Maria N. Von Buhr
(74) Attorney, Agent, or Firm—Armstrong, Kratz, Quintos, Hanson & Brooks, LLP

(57) ABSTRACT

A user creates image data where the user optionally designs an arrangement and a size of each meter in a combination meter on a personal computer screen based on meter designing data DT1 including manufacturing conditions at a user-side meter designing section. Combination meter producing data DT2 is generated from the image data and sent to a combination meter manufacturing data processing section. The processing section derives meter manufacturing data DT3 from the meter producing data DT2. Consequently, the data processing section automatically sends out an order of manufacturing the combination meter to a manufacturer side. The manufacturer side assembles the combination meter according to the meter manufacturing data DT3.

6 Claims, 21 Drawing Sheets

| number | method | tool | obtained data | | comment |
|---|---|---|---|---|---|
| 1 | select a type of vehicle | personal computer | vehicle type, vehicle specification, rpm, manual, etc. outer shape of a meter | optional | 'select from options' is also available |
| 2 | background design | | character board design | free | |
| 3 | speedometer scale design decision | | character board design | optional | design for a speedometer |
| 4 | speedometer position decision by needle position | | gauge position | by mouse dragging | moving in a fixed interval (e.g. every 5mm) |
| 5 | speedometer size(radius) decision | | gauge size | by mouse dragging | magnifying in a fixed interval (e.g. every 5or 10mm) |
| 6 | swing angle of the needle decision | | gauge swing angle | by mouse dragging | |
| 7 | decision of speedometer scale length/thickness | | character board design | by mouse dragging | |
| 8 | speedometer scale color selection | | character board design | optional | |
| 9 | Specifying the typeface,weight ,color of the scale markings | | character board design | optional | optional gauge |
| 10 | select tacho, fuel, temp meter design as same as above | | character board design gauge swing angle gauge size gauge position | optional by mouse dragging | |
| 11 | needle design selection | | needle shape | optional | |
| 12 | meter movement simulation | | verifying the operations | | |
| 13 | end of meter design | | design decision data decision | | |

F I G. 1 0 inner marks 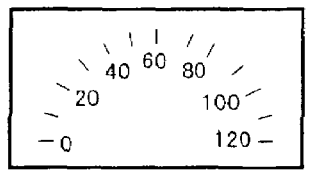 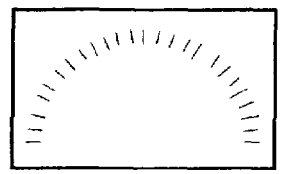 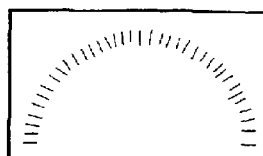
every 10mph    every 5mph    every 2mph
inner marks with outline 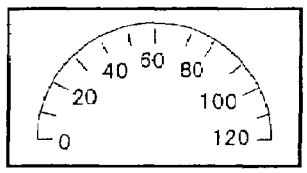 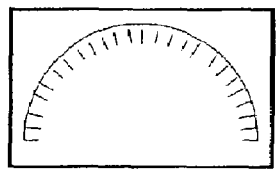 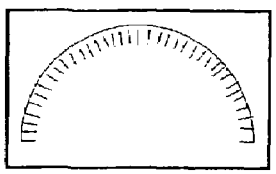
outer marks 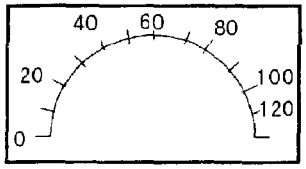 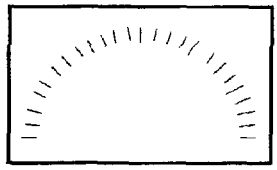 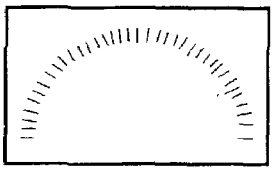
outer marks with outline 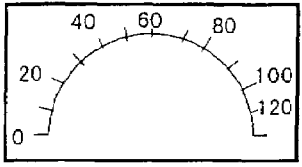 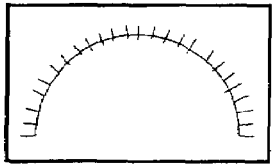 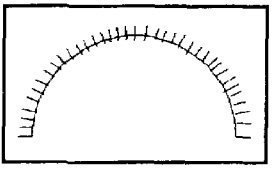
F I G. 1 5 A
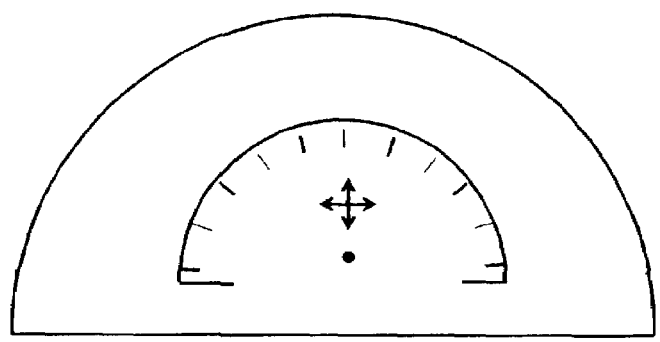
F I G. 1 5 B
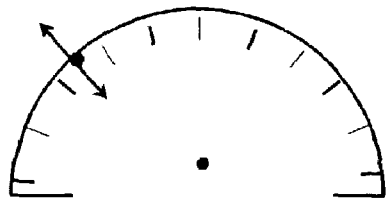
F I G. 1 5 C

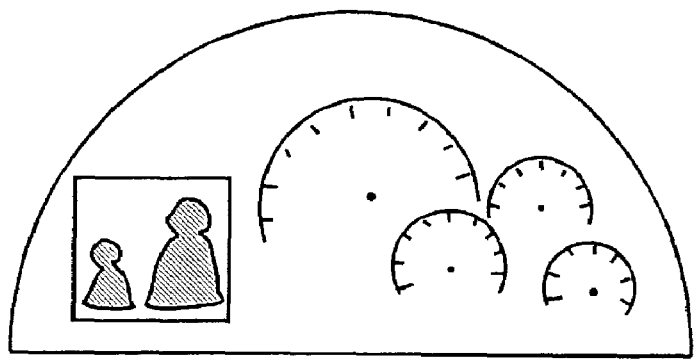
FIG. 17
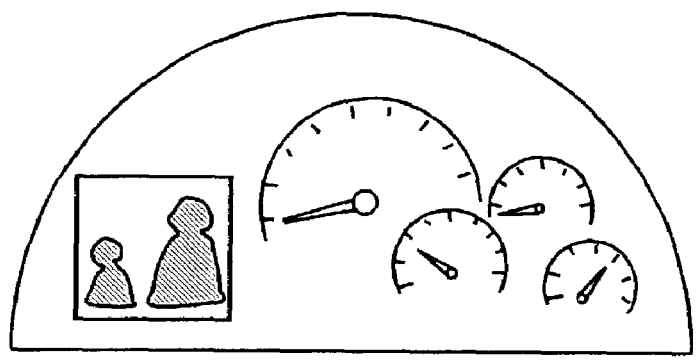
FIG. 18A
| A type | edge light illumination |
|---|---|
| B type | edge light illumination |
| C type | edge light illumination |
| D type | irradiation |
| E type | irradiation |
FIG. 18B

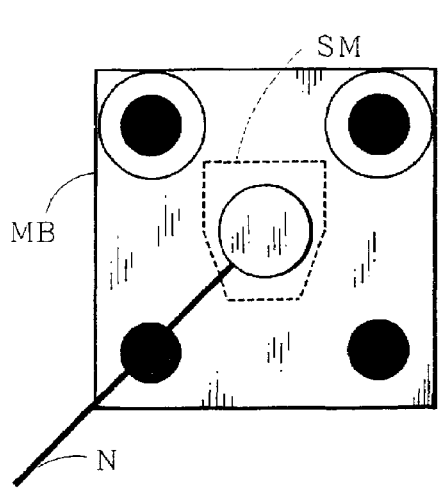 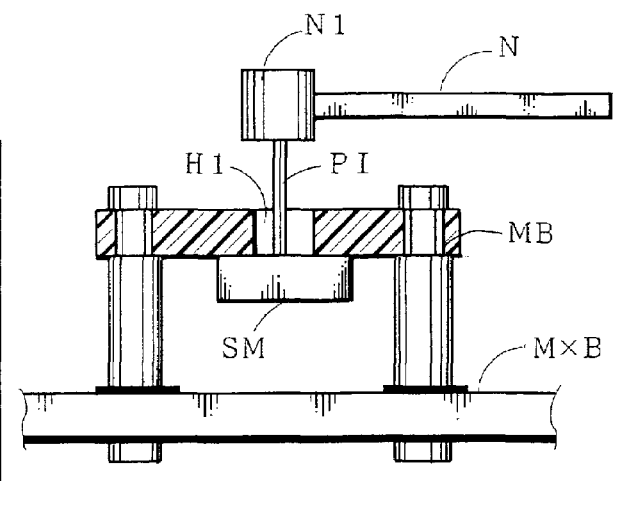
FIG. 22A    FIG. 22B
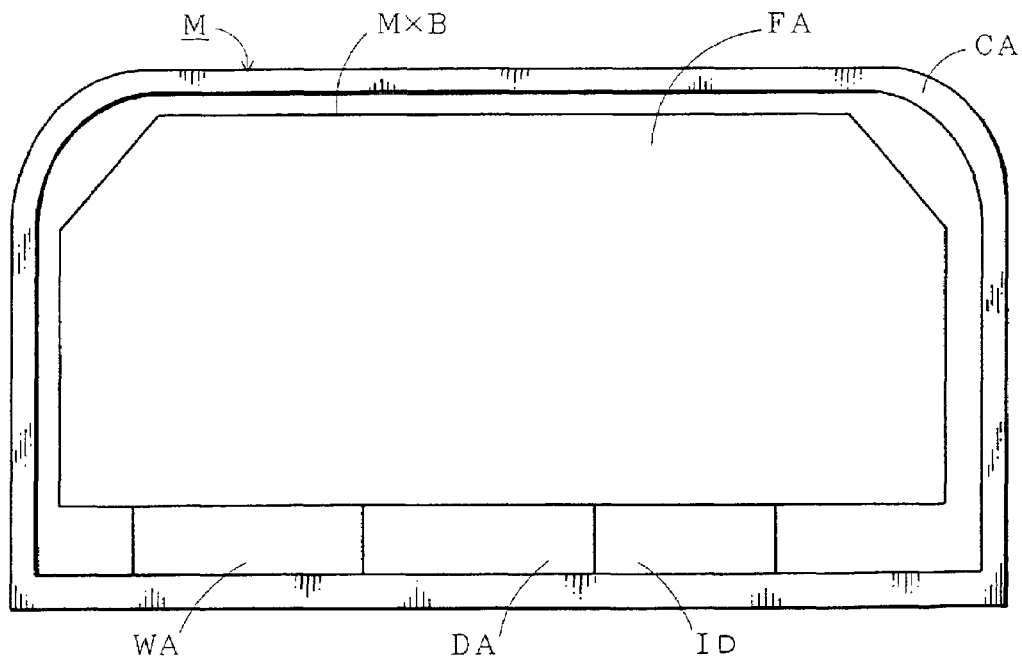
FIG. 23

SYSTEM FOR MANUFACTURING A CUSTOMIZED METER

BACKGROUND OF THE INVENTION

1. Field of the Invention

The present invention relates to a system for manufacturing a customized meter. For example, a data processing unit supplies meter designing data with which a user can design a custom-made combination meter of a vehicle on a display screen. Then, the meter producing data is generated according to the user-designed data. The data processing unit derives meter manufacturing data from meter producing data. The data processing unit supplies said meter manufacturing data to a manufacturer to manufacture a customized combination meter.

2. Description of the Related Art

Heretofore, there is a watch design creating system such as described in JP-A-11-305650 issue bulletin. (The term "JP-A" as herein means "unexamined published Japanese patent application") In this system, a user orders a maker to manufacture a watch based on user designed data by downloading designing data of a desirable watch and modifying the designing data to more desirable data on a display screen.

Further, there is a known system such as a support system for determining design specification. This system is described in JP-A-8-30674 issue bulletin. In this system, an owner designs an elevator with a computer interactively. Images of an elevator cage and an elevator door based on the determined design are displayed on a computer screen. While watching the displaying result, the owner modifies to the more desirable design. At last, the owner acquires the most agreeable design.

In a conventional system such as above mentioned, however, it is only possible to change forms or colors of components of a product displayed on a screen by a user's choice and the positions of the components are immovable. It is impossible to manufacture a user's favorite product on the display screen by changing a position or size of each component thereof. That is, the system has a limit for designing the product freely and lacks flexibility. Therefore, if this system is offered to a user, it may not satisfy the user's desires.

Further, even if it is possible to set a size and layout of the components on the display screen, when assembling a manufacture actually, it is necessary to design an entire product according to above constraints. Therefore, there is a problem that manufacturing a large item small volume production of a custom-made combination meter makes the unit price of the product soar and is unprofitable.

Further, in a conventional system, only data of a static design is available for user option. Image data of a product is created based on above user selected data. An actual product is manufactured actually based on design data generated from the image data as above.

However, in the case elements including moving components, the above systems may not be able to satisfy a user with the above design, despite allowing the user to confirm static design on the screen. This is because the user cannot simulate a motion on the screen, when the user wants to confirm his designed motion. Furthermore, because above systems have no means to reflect user designed motion on created image data, there is an inconvenience that the extent of design, which the systems allow to apply, is limited to a static design.

SUMMARY OF THE INVENTION

The present invention has been accomplished to solve the above described problems and an object of the present invention is to provide a system for manufacturing a customized meter in which flexibility of a combination meter design by a user can improve, and without a large change of a meter manufacturing condition corresponding to a change of each large item small volume production of combination meters, a manufacturer side can cope with various kinds of combination meter manufacture.

A system for manufacturing a customized meter according to a first aspect of the present invention, as shown in schematic diagram FIG. 1, comprises a user-side meter designing section 1 and a combination meter manufacturing data processing section 2. The processing section 2 supplies the designing data DT1 to the designing section 1. The designing section 1 displays a combination meter on a display screen for designing by a user based on supplied meter designing data DT1. The designing data DT1 allows combination meter designing within an area of installation of a combination meter on a substrate for assembling a combination meter at the manufacturer side 3. Then, the designing section 1 generates combination meter producing data DT2 based on the combination meter designed by the user. The designing section 1 sends the producing data DT2 to the processing section 2. The manufacturing data DT3 is derived from the producing data DT2. And the processing section 2 sends out an order of manufacturing a combination meter to a manufacturer side 3 by supplying combination meter manufacturing data DT3.

The combination meter producing data DT2 is designed at the user-side by determining an arrangement of various meters and a size of each meter based on the designing data DT1. The processing section 2 deciphers the producing data DT2 which is sent back from the designing section 1. The processing section generates meter drafting data DT20 according to the deciphering result. Then, the processing section automatically sends out an order of manufacturing the combination meter to the manufacturer side 3 by deriving the manufacturing data DT3 from the drafting data DT20.

According to the first aspect of the present invention, a user U creates image data of a combination meter after designing an arrangement and a size of each meter optionally on a personal computer screen using the designing data DT1. Then, the producing data DT2 is generated from the image data and sent to the processing section 2. The processing section 2 derives the manufacturing data DT3 from the designing data DT2. Consequently, the processing section 2 automatically sends out an order of manufacturing the combination meter to the manufacturer side 3. The manufacturer side 3 assembles the combination meter according to the manufacturing data DT3.

In the system according to a second aspect of the present invention, the processing section 2 provides the designing section 1 with the designing data DT1. The designing data DT1 includes a plurality of design data, needle drive data and meter drive simulation data based thereon for imaging the combination meter.

According to the second aspect of the present invention, the user creates the image data of the combination meter on a personal computer screen with the designing data DT1 at the designing section 1. The user determines an arrangement and a size of each meter, design of scale marks on each scale plate and each swing angle optionally. Then, the meter producing data DT2 is generated from the image data and sent to the processing unit 2.

In the system according to a third aspect of the present invention, according to the designing data DT1, the designing section 1 displays images of a plurality of design data and indicator drive data, as options for the user to select on the display screen. Then, the designing section 1 displays image data of a combination meter in a combination of data selected therefrom. And the designing section 1 changes colors of moving needles or indicator panels of the combination meter displayed on the display screen with colors selected by the user according to meter drive simulation data.

In the system according to a forth aspect of the present invention, the designing section 1 generates the producing data DT2 from the image data of the combination meter displayed on the display screen and a meter drive simulation result. And the designing section 1 sends the producing data DT2 to the processing section 2. Then, the processing section 2 automatically sends out the order of manufacturing the combination meter to the manufacturer side 3 by deriving the manufacturing data 3 from the producing data DT2. The manufacturing data DT3 includes design elements of combination meter design, parts data for specifying each part, needles drive data for CPU drive control and display units light data.

According to the forth aspect of the present invention, the processing section 2 derives the manufacturing data DT3 from the producing data DT2 as described above. The processing section DT2 makes the manufacturer side 3 manufacture the combination meter according to the manufacturing data DT3 and load the meter drive data into CPU thereof.

In the system according to a fifth aspect of the present invention, a main substrate has a plurality of lands on a surface thereof at specified space intervals by matrix figure where meter components are attached. The combination meter is assembled on the main substrate in the manufacturer side 3. Auxiliary substrates where meter movements are assembled are installed on the main substrate in accordance with each predetermined meter arrangement. Electric wiring materials are arranged on the auxiliary substrates in accordance with an interval of said lands. Various display units are arranged on the main substrate.

According to the fifth aspect of the present invention, the manufacturer side 3 assembles the auxiliary substrates on an area of installation of the combination meter according to an arrangement of meters the user U designed. The auxiliary substrates for mounting meter movements are common to various movements. And the manufacturer side 3 arranges various display units. Thus, the manufacturer side 3 manufactures an inner assembly board of the combination meter.

In the system according to a sixth aspect of the present invention, the base substrate comprises a control unit. The control unit stores both the needles drive data and the display units light data and includes CPU. The CPU controls the movements and display units based on data, which is stored in the control unit.

The above and other objects and features of the present invention will be more apparent from the following description taken in conjunction with the accompanying drawings.

BRIEF DESCRIPTION OF THE DRAWINGS

FIG. 10 is an explanatory table showing a customized meter design procedure;

FIGS. 15A to 15C are drawings, showing a method to select a design type, position and size of a scale plate;

FIG. 17 is a layout drawing, showing an arrangement of each scale plate on a character board;

FIGS. 18A to 18B are explanatory drawings, showing a method of setting needles at respective scale plates;

FIGS. 22A to 22B are drawings, showing a movement assembly and a figure of installing said assembly on said matrix base substrate;

FIG. 23 is a drawing, showing a figure of housing a matrix base substrate in a case;

DESCRIPTION OF THE PREFERRED EMBODIMENT

Figure 1:
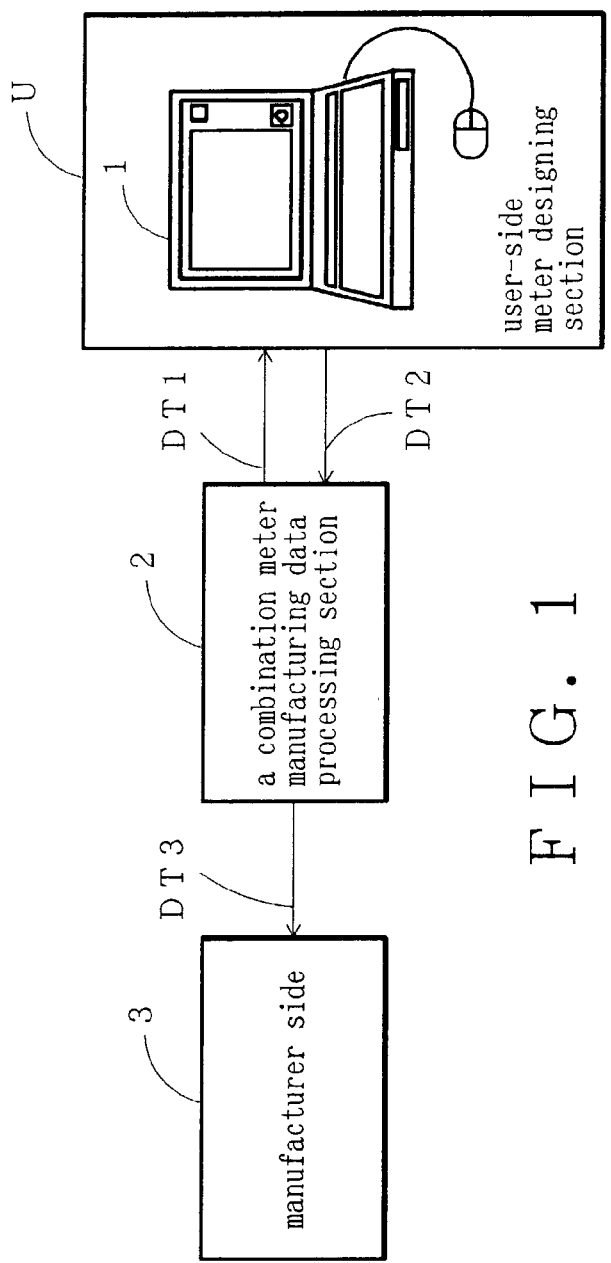
FIG. 1 is a schematic diagram, showing a system for manufacturing a customized meter according to the present invention.

Now, an embodiment according to the present invention will be described in detail referring to the drawings.

FIG. 4 to FIG. 9 shows some embodiments of the present invention. They are customized meter business schemes taking in system for manufacturing a customized meter. In the schemes, a user designs a customized meter based on design software of customized meters sent from a vehicle dealer, then, orders said customized meter from a maker.

Customized Meter Business Scheme 1

Figure 4:
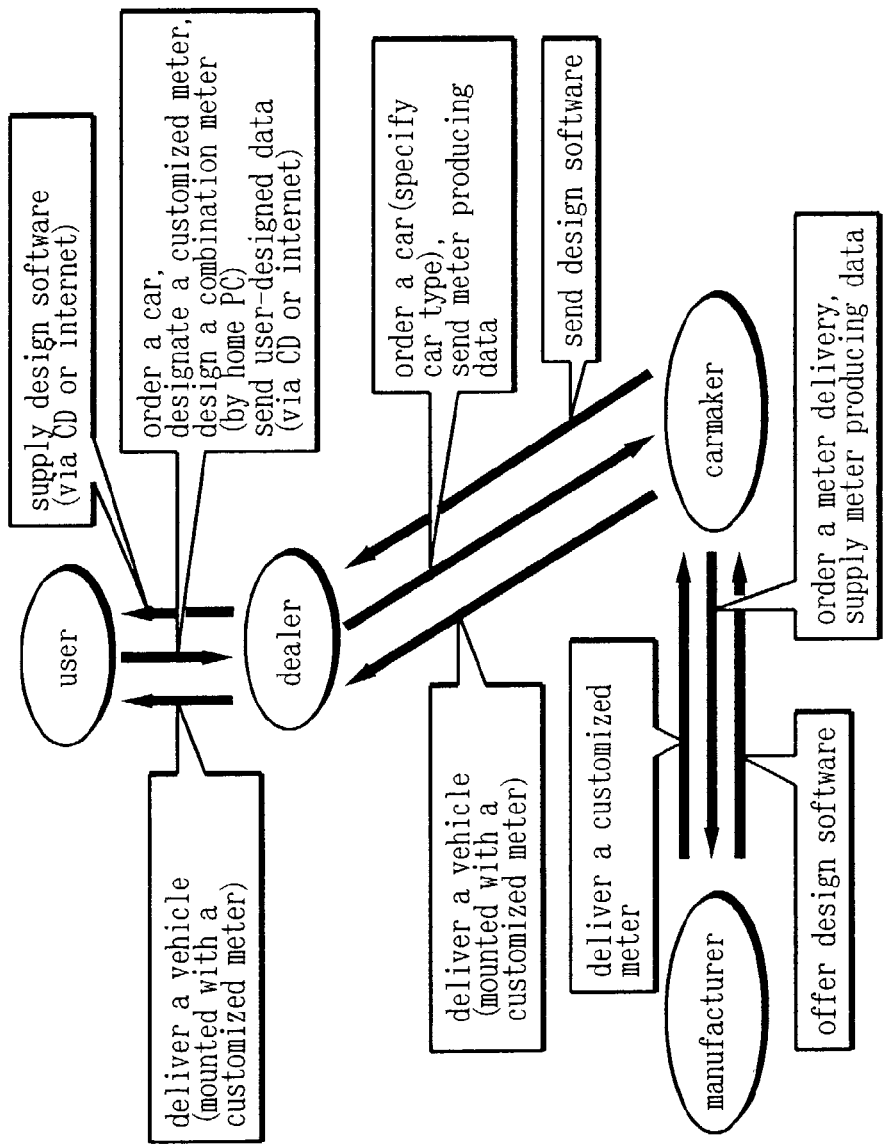
FIG. 4 is a brief explanatory drawing, showing a customized meter business scheme 1.
Figure 5:
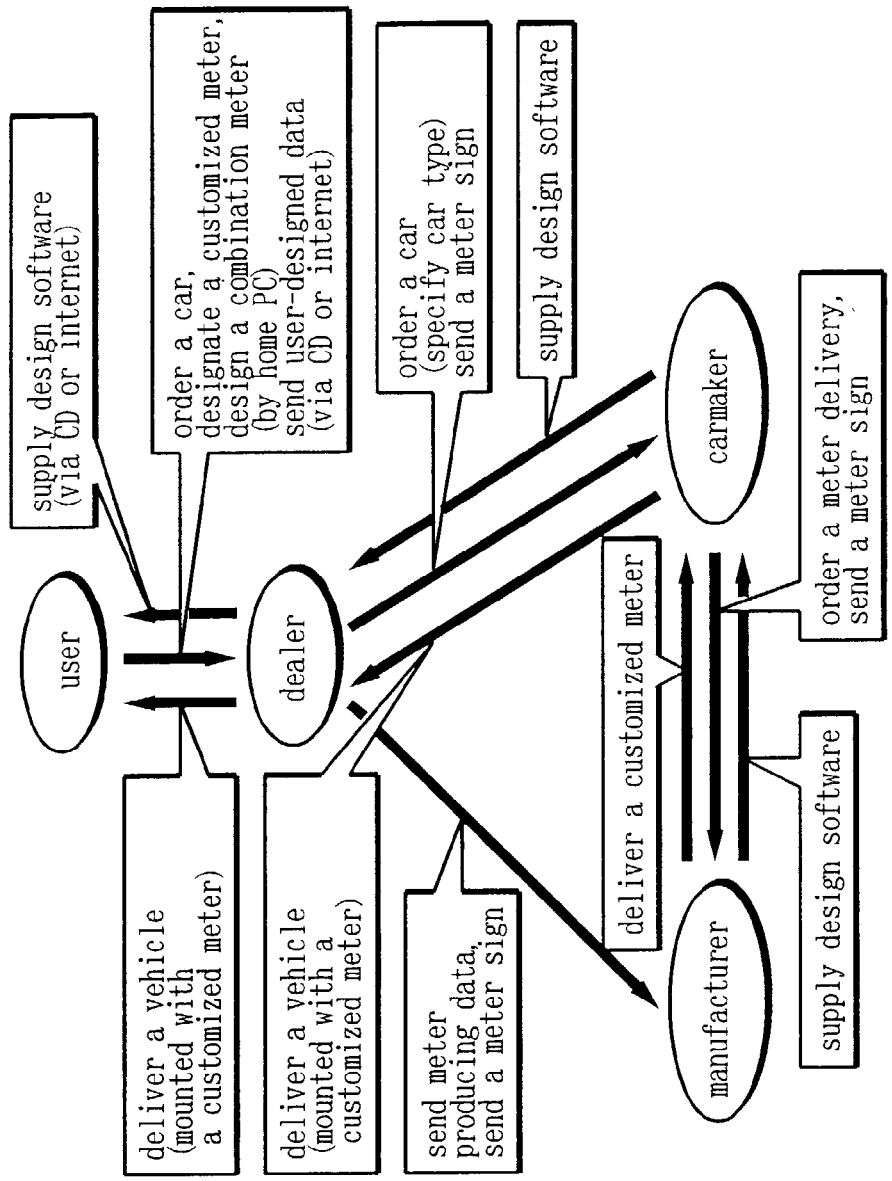
FIG. 5 is a explanatory drawing, showing a customized meter business scheme 2.

As shown in FIG. 4, before ordering a vehicle from the dealer, the user makes the dealer supply design software of a custom-made combination meter on vehicle (hereinafter referred to as customized meter) by CD or internet via a meter manufacturer side (e.g. YAZAKI) and a carmaker.

The user, when receives the design software, orders a vehicle and designates combination meter design of a combination meter as user-customized design. Then, the user creates meter design by building image data of the customized meter on the display screen of user's personal computer. Then, user-designed data is sent to the dealer with CD or internet. The dealer, when receiving the user-designed data, orders a vehicle including car type information from the carmaker and sends the meter producing data thereto.

On receiving the meter producing data, the carmaker sends the meter producing data with an order letter of the meter to a meter manufacturer side. On receiving the meter producing data with the order letter of the meter, the meter manufacture actually manufacture the customized meter based on the meter producing data and deliver it to the carmaker. The carmaker mounts the delivered customized meter on the ordered car and delivers the car to the dealer. Then, the dealer delivers the car mounted with the customized meter to the user.

Customized Meter Business Scheme 2

In the scheme 1, the dealer supplies the meter producing data based on the meter designing data to the carmaker. In a customized meter business scheme 2 shown as FIG. 5, the dealer directly supplies the meter producing data with a meter sign to specify such customized meter to the meter manufacturer side. The dealer sends an order letter of a vehicle and the meter sign to the carmaker. The carmaker, when receiving the order of the vehicle, sends the meter sign with the order letter of the meter. Other flows are similar to Customized meter business scheme 1. As a result, a period to ordering the meter manufacturing is shortened.

Customized Meter Business Scheme 3

According to the above Customized business scheme 1 and 2, the meter manufacturer side delivers the customized meter to the carmaker and the carmaker delivers a vehicle with the customized meter to the user after mounting the vehicle with the customized meter.

Figure 6:
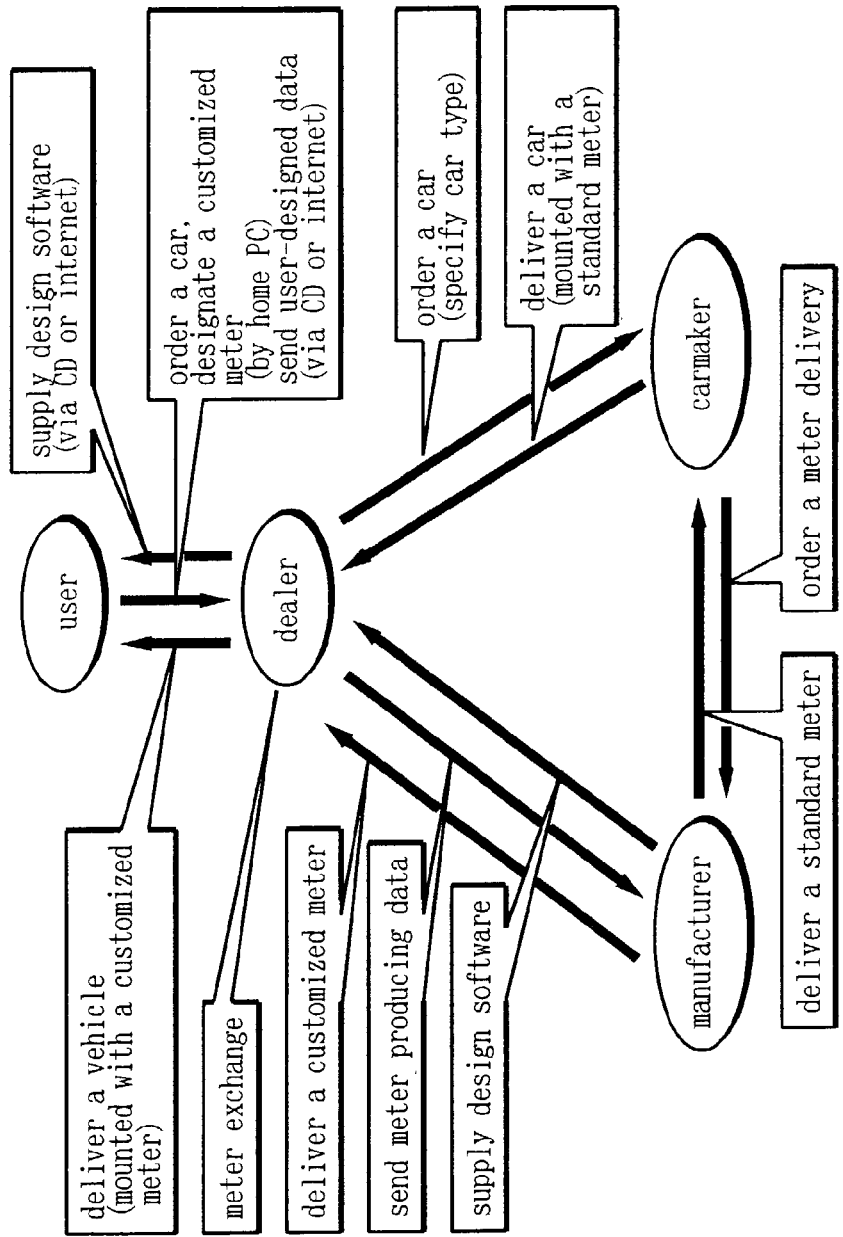
FIG. 6 is a explanatory drawing, showing a customized meter business scheme 3.

In this Customized meter business 3, as shown in FIG. 6, in order to shorten the length of time required for delivery of a vehicle mounted with a customized meter, first the meter manufacturer side delivers a standard meter to the carmaker on receiving an order of the meter. Second, the carmaker delivers a vehicle mounted with the standard meter to the dealer.

At this time, the manufacturer side supplies design software to the user via the dealer. The user sends the user-designed data of the customized meter based on the design soft to the dealer.

The dealer makes the manufacturer side manufacture a customized meter by sending the meter producing data thereto. The customized meter is delivered to the dealer. And the dealer exchanges the standard meter installed in the previously delivered vehicle for the customized meter. Then, the dealer delivers the vehicle to the user.

Customized Meter Business Scheme 4

Figure 7:
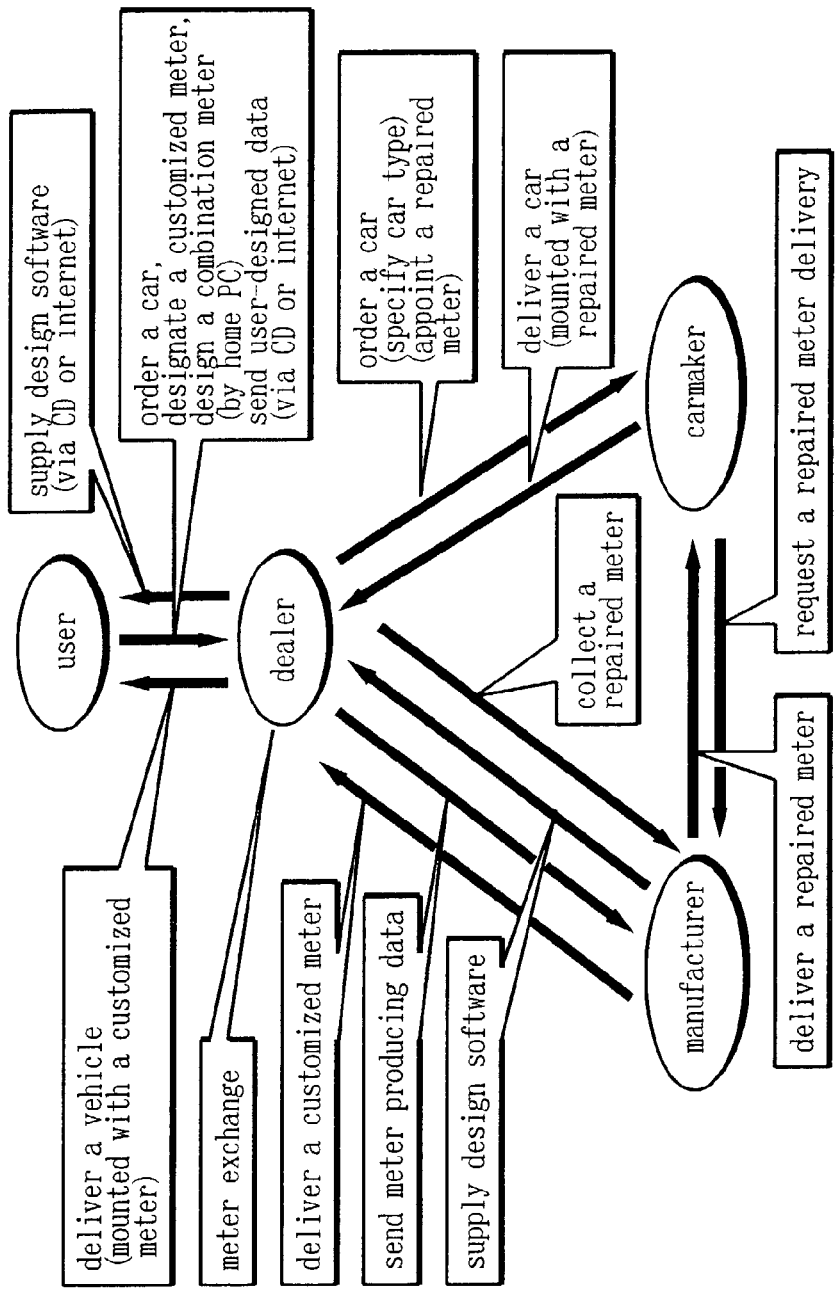
FIG. 7 is a explanatory drawing showing a customized meter business scheme 4.

According to the above Customized business scheme 3, when some flaw or damage is found on the standard meter, the meter may be disposed of after the dealer detached the meter from the vehicle. In this Customized meter business scheme 4, with a purpose to utilize resources, the carmaker delivers a vehicle mounted with a repaired meter to the dealer instead of the standard meter as shown in FIG. 7. The repaired parts are made of recyclable parts. The dealer exchanges the repaired meter for the customized meter delivered from the meter manufacturer (e.g. YAZAKI). Then, the dealer sends back the repaired meter to the manufacturer side to collect.

Customized Meter Business Scheme 5

Figure 8:
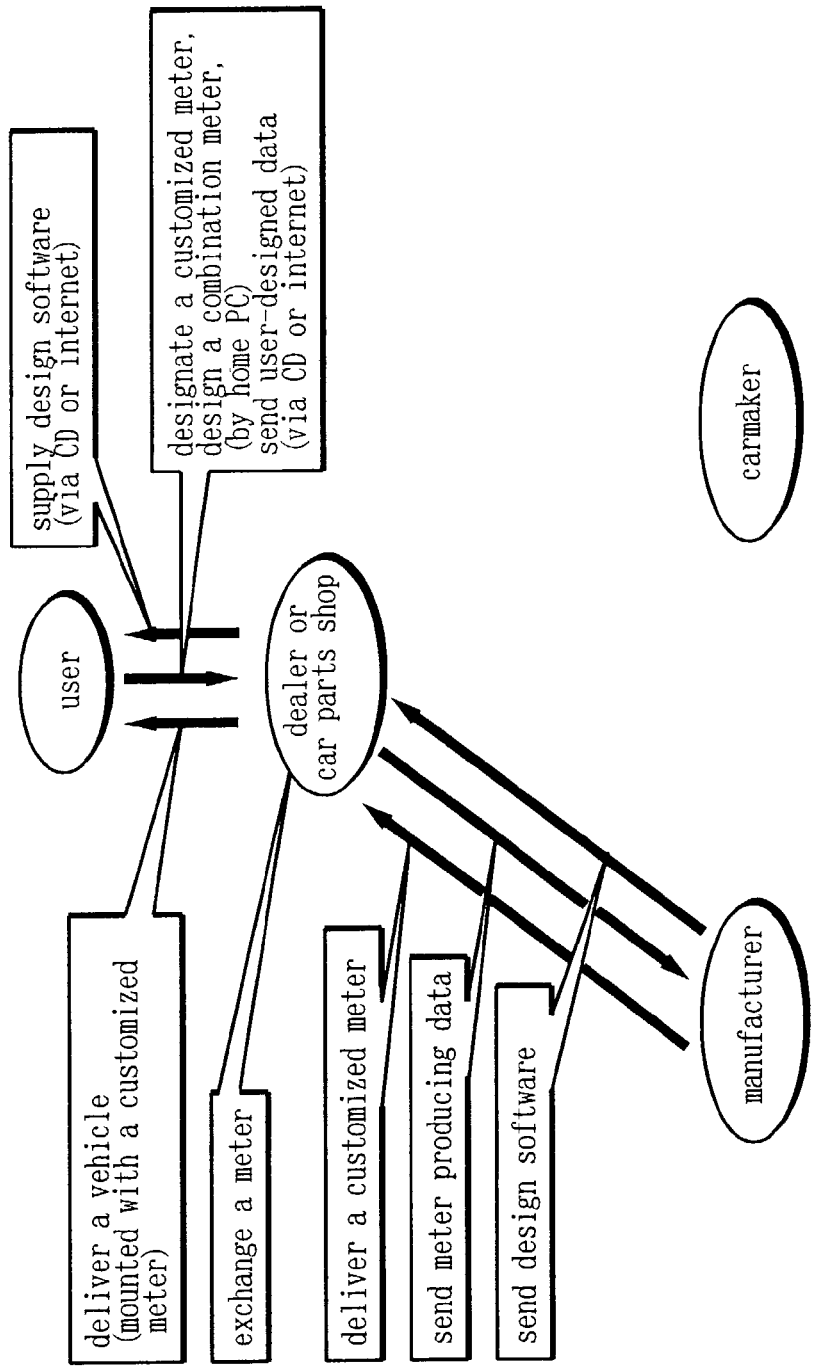
FIG. 8 is a explanatory drawing, showing a customized meter business scheme 5.

According to the above Customized meter business scheme 1 to 4, after the delivery of a vehicle from the carmaker, the dealer installs or exchanges a customized meter on the vehicle. In this Customized meter business scheme 5, as shown in FIG. 8, the dealer exchanges a meter installed in a user's vehicle for a customized meter as an after-sales service for the user.

On receiving the meter producing data from the dealer or from a car parts shop, the manufacturer side manufactures a customized meter. The manufacturer side delivers the meter to, for example, the dealer. The dealer exchanges the meter installed in the user's vehicle for the customized meter.

Customized Meter Business Scheme 6

Figure 9:
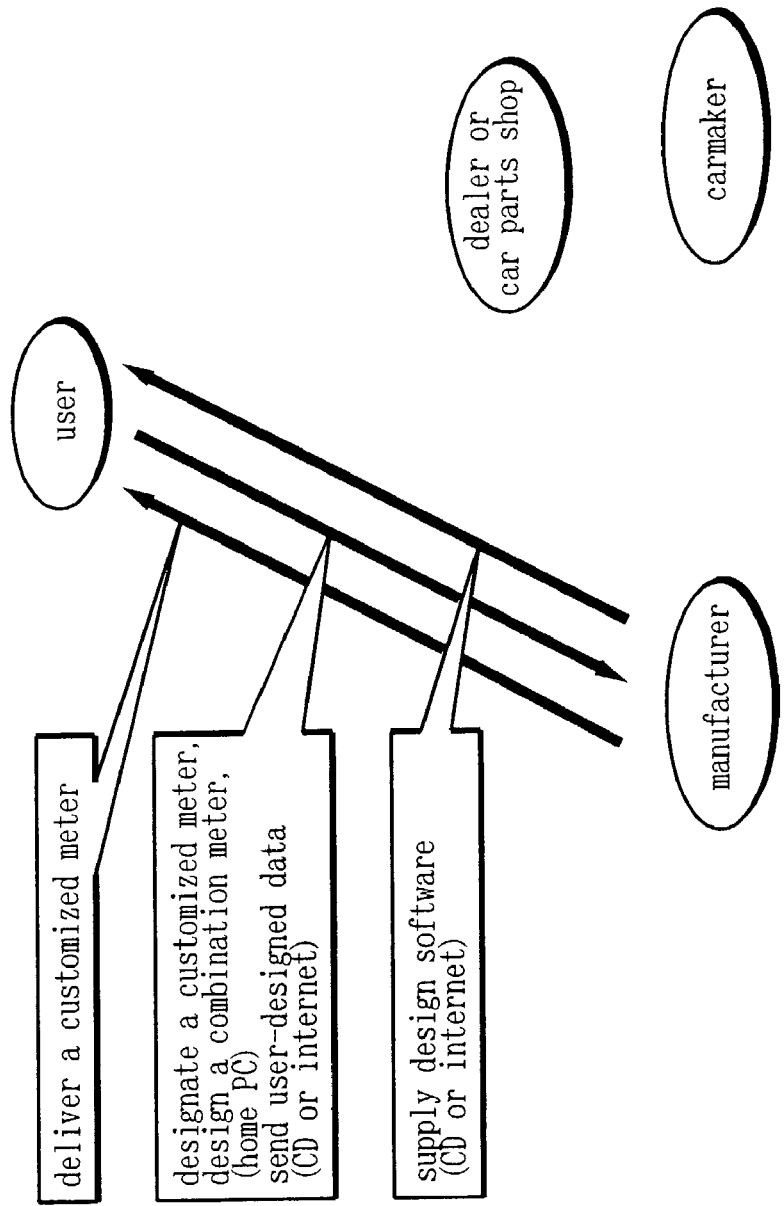
FIG. 9 is a explanatory drawing, showing a customized meter business scheme 6.

According to the above Customized business scheme 1 to 5, the dealer or the car parts shop installs or exchanges for a customized meter. In this Customized meter business scheme 6 as shown in FIG. 9, in the case that the user can install or exchange for a customized meter himself, first user makes the manufacturer side supply the design software directly to the user. Second, the user sends the user-designed data directly to the manufacturer side. Third, the manufacturer side manufactures the customized meter according to the user-designed data and delivers it to the user via, for example, parcel delivery service. Finally, the user installs the meter in his vehicle by himself. As a result, this scheme 6 is able to shorten a period from manufacturing to delivery of a customized meter compared to other Customized business schemes.

Figure 2:
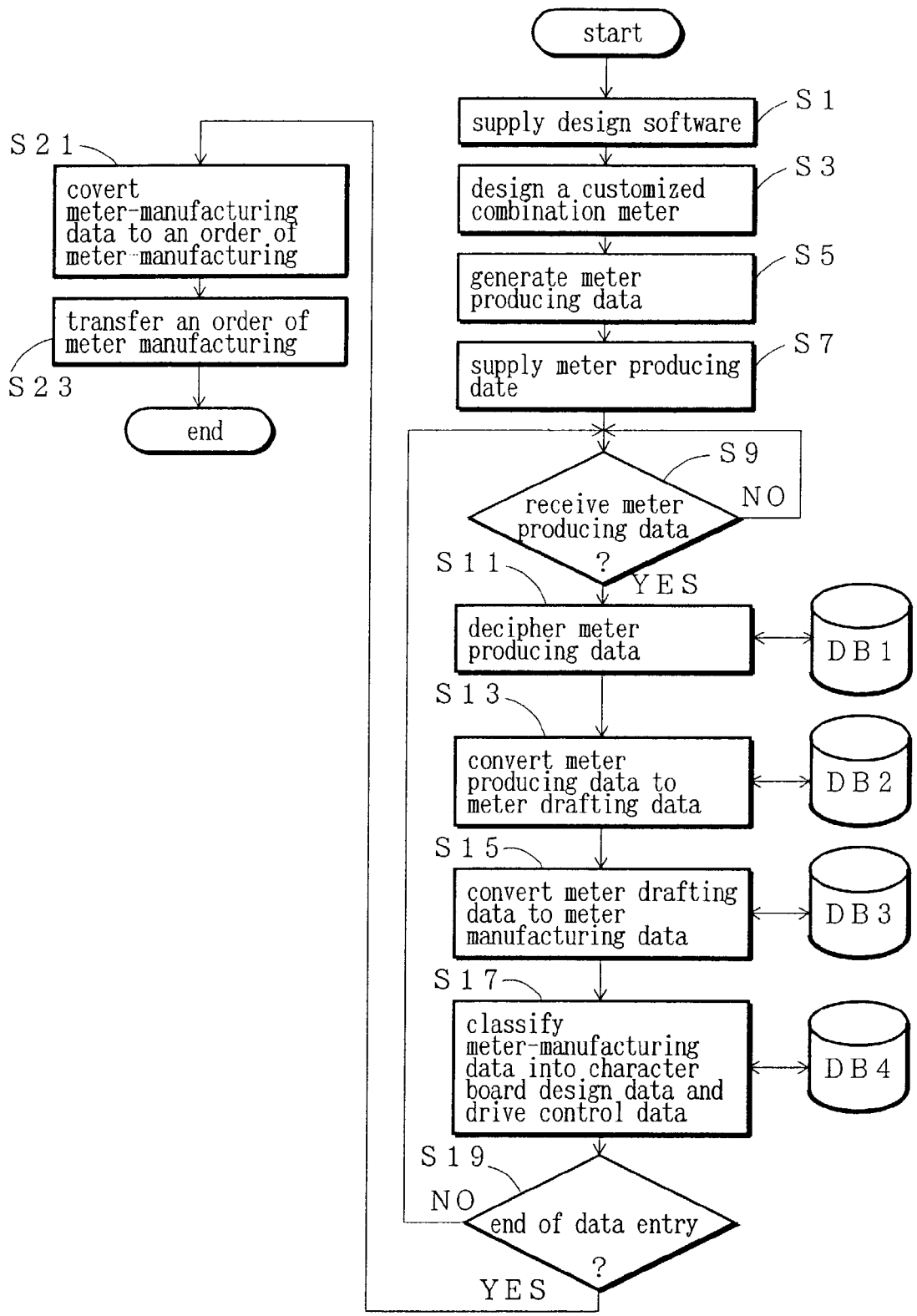
FIG. 2 is a flow chart explaining, accounting for a data processing method of a system for manufacturing a customized meter according to the present invention.

The following is a detailed method to embody the system for manufacturing a customized meter. FIG. 2 shows a flowchart for explaining procedures to transfer an order of manufacturing the combination meter to the meter manufacturer side based on a result of deciphering the meter producing data sent by the user-side meter designing section.

In this case, both the dealer and the meter manufacturer side described in FIG. 4 to FIG. 9 can derive the order of manufacturing the meter from the meter producing data. In business, a user is a customer for a dealer, a carmaker and a meter manufacturer.

For example, in Customized meter business scheme 1 as shown in FIG. 4, in case that the user ordering a vehicle from the dealer wants to exchange a combination meter installed in the vehicle for a meter of the user's favorite, the user indicates an order to the dealer. Then, the dealer gets a hold of the design software from the meter manufacturer side via the carmaker.

As shown in other business schemes, it is also possible that the carmaker or the meter manufacturer side directly supplies design software to a user.

The dealer supplies the design software to the user via, for example, internet (S1). The user designs a customized combination meter as image data on a personal computer screen based on the design software (S3). Then, the user verifies the motion on the same screen by computer animation. Then, the user creates the user-designed data such as design of a customized meter, indicator drive movement, display behavior, etc. by personal computer (S3) and sends the data to the dealer via internet.

According to received user-designed data, the dealer generates the meter producing data in order that the meter manufacturer side can manufacture a meter actually from the design and supplies the data to the carmaker. The carmaker further supplies the meter producing data to the meter manufacturer (S5, S7).

The meter manufacturer side inputs the meter producing data. Then, the manufacturer side deciphers the data based on prescribed application program stored in database DB1 (S11). Next, the manufacturer side converts the data into meter drafting data stored in database DB2 (S13). Next, the manufacturer side further converts the meter drafting data into meter manufacturing data. The meter manufacturing data adapts to manufacture actually on a matrix base substrate. The matrix base substrate is prepared for combination-meter manufacturing by the meter manufacturer side (S15).

Further, the meter manufacturing data is classified into character board design data and drive control data. The character board design data includes such as arrangements, shapes, colors, needle shapes of meters on respective scale plates of a combination meter, scale resolutions engraved on respective scale plates. The drive control data relates needle drive control and display control to external signals. And these data are stored in database DB4 (S17). The board design data and the control data are converted to an order of meter manufacturing at an end of an entry of the meter producing data (S19). The order is transferred to meter manufacturing line (S21, S23).

Figure 3:
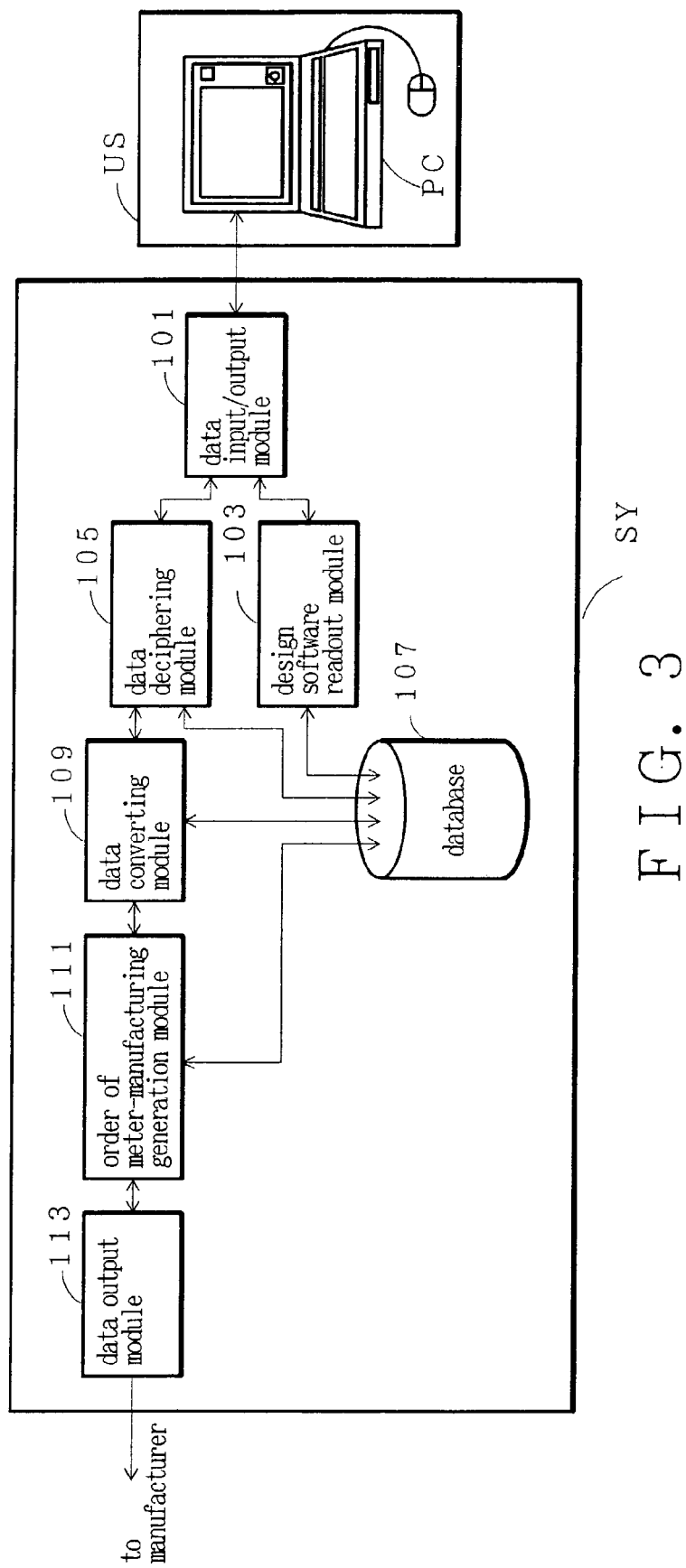
FIG. 3 is a schematic diagram, showing one embodiment of a system for manufacturing a customized meter according to the present invention.

FIG. 3 shows a schematic view of a constitution of the system embodiment. This system SY comprises such as data input/output module 101, design software readout module 103, data deciphering module 105, database 107, data conversion module 109, order of meter-manufacturing generation module 111 and data output module 113. The data input/output module 101 inputs and outputs data relate to meter design with user-side US. The design software readout module 103 transfers the design software from database 107 to user US via the data input/output module 101. The data deciphering module 105 inputs the meter producing data generated at US based on the design software via data input/output module 101, deciphers the data using a program stored in database 107, and stores a deciphering result in database 107. The data conversion module 109 converts the meter drafting data to meter manufacturing data according to the deciphering result.

The order of meter-manufacturing generation module 111 converts the meter drafting data to the meter manufacturing data. The generation module 111 generates the order of meter-manufacturing. The generation module 111 classifies meter-manufacturing data into the character board design data and the drive control data as above described. The generation module 111 stores these data in database DB4. The generation module 111 sends the meter manufacturing data to the manufacturer side via the output module 113.

Further, this system includes at least either the dealer or the meter manufacturer and the user in any customized business scheme.

Thereinafter, procedures from designing customized meter by the user to manufacturing the meter by the manufacture side are described according to the Customized business scheme 1 as shown in FIG. 4 by way of example.

User

The user loads the software into memory of user's personal computer on receiving the design software supplied by the manufacturer side from a dealer via internet. Then, the user selects meter design options according to a customized meter designing procedure shown in FIG. 10.

Selection of a Vehicle Type

The user clicks to select a type of vehicle ordered previously by the user from among types listed on the personal computer screen. As a result, the user acquires data of the type of vehicle, a specification of selected vehicle, a engine RPM (round per minute), a transmission type (manual or automatic), and data for figurations of various meters such as speedometer, tachometer, fuel gauge and thermometer in a combination meter.

Background Design

Figure 11A:
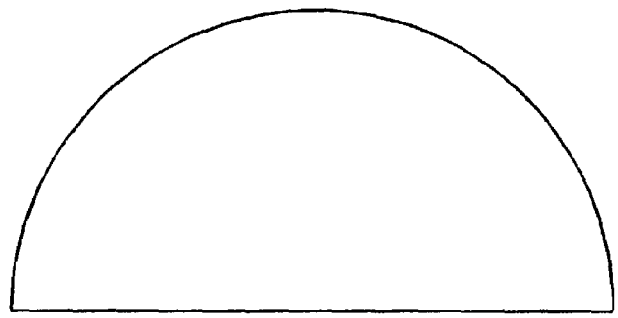
FIGS. 11A to 11B are explanatory drawings showing a method to select a background design of a character board of a combination meter.
Figure 11B:

Next, when the screen is updated, a character board of a combination meter is displayed on the display screen such as shown in FIG. 11A. Options displayed on this screen such as shown in FIG. 11B are described below:

each background pattern of the character board;

each arrangement of scale plates of the character board;

each size of pictures displaying area placed on a blank space of the character board;

each illustration displayed as a background picture of the character board; and a free white board on which handwriting illustration directly or captured image created by paint software such as 'Paint', 'Illustrator', 'PhotoShop' can be displayed.

The user clicks to select data from above options to display on a character board with selected background design.

Scale Plate Design

Figure 14:
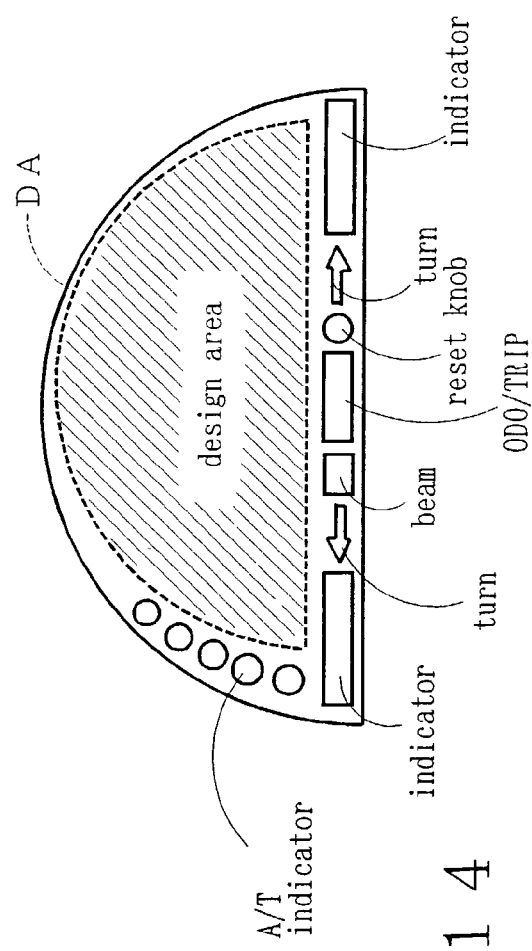
FIG. 14 is a drawing, showing a design area of a scale plate of a combination meter.
Figure 12:
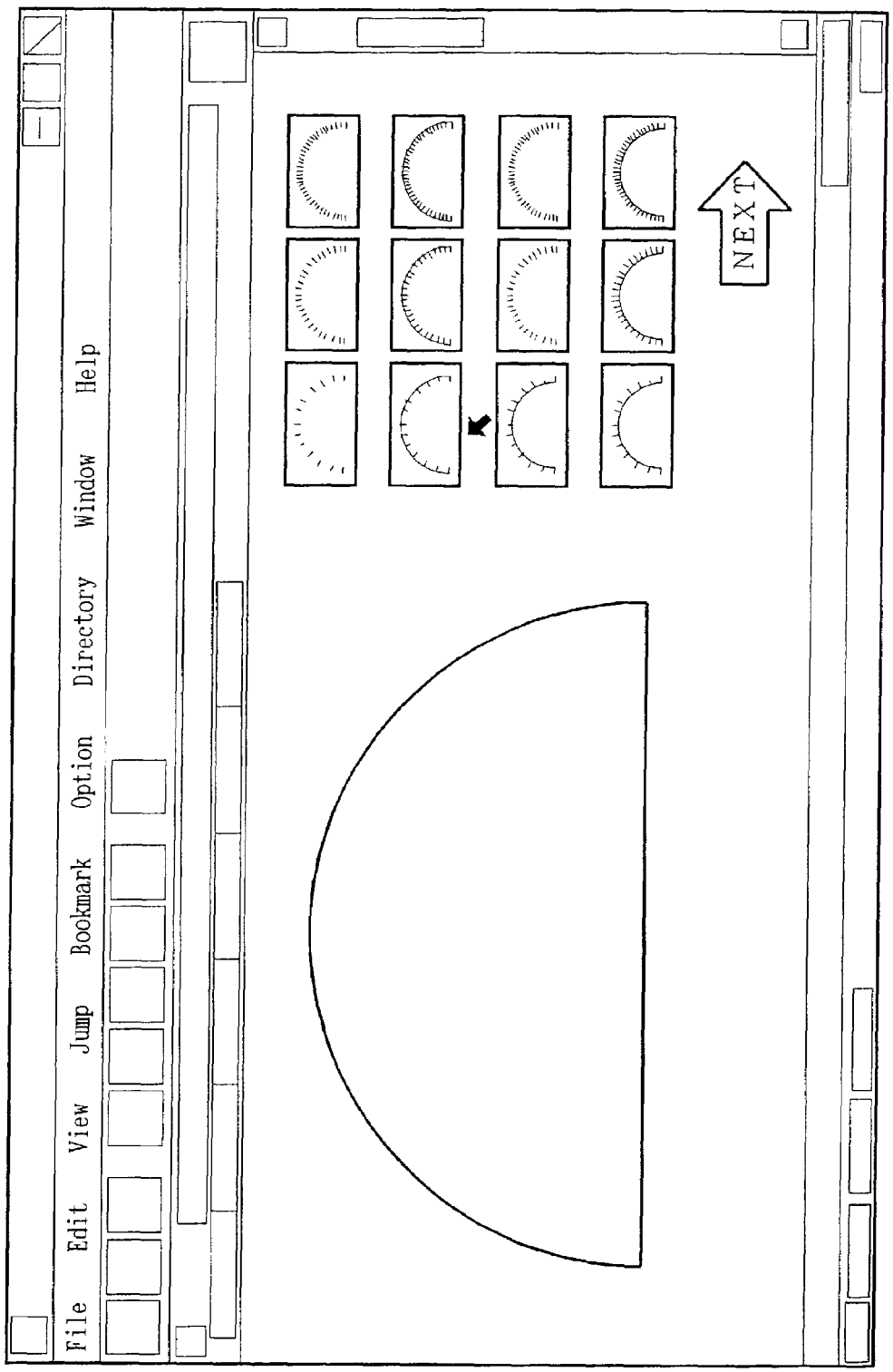
FIG. 12 is a personal computer screen in selecting a background design of a character board of a combination meter.

After determining background design of the character board, the character board and various scale plate designs are displayed on the personal computer screen such as shown in FIG. 12. The user clicks to select one favorite speedometer scale plate design to display on a scale plate design area DA as shown in FIG. 14 from among various scale plate designs shown in FIG. 15A.

Meter Position Decision

When scale plate design is selected, the selected design is dragged & dropped (hereafter referred to as "dragged") to the display position on the character board as shown in FIG. 15B. The display position of this scale plate is displayed with needle fixed point as a reference point in scale plate design. The scale plate on the whole is movable such as every about 5 mm from side to side and up and down by dragging and moving the needle fixed point on the character board.

Meter Size (Radius) Decision

When the position of the speedometer scale plate is determined on the character board, a radius of the scale plate, namely the meter size is changeable such as every about 5 or 10 mm by dragging and moving a scale position inward or outward as shown in FIG. 15C.

Swing Angle of the Needle Decision

Figure 16A:
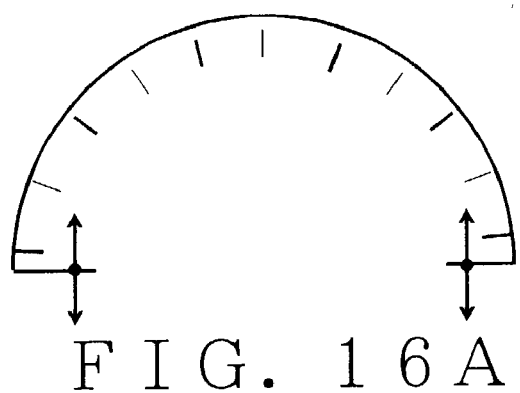
FIGS. 16A to 16D are explanatory drawings, showing a process of setting property design of a scale plate.

When the meter position and radius are determined, a maximum swing angle of the needle is determined. This angle is formed between 0 mph and a maximum speed angle. To determine the angle, a cursor is moved circularly from 0 mph point to the maximum speed point on the displayed scale plate as shown in FIG. 16A. Each mark on the scale is divided amount equally in a full extent of an outline of the scale.

Length/Thickness of the Marks of the Scale Plate

Figure 16B:
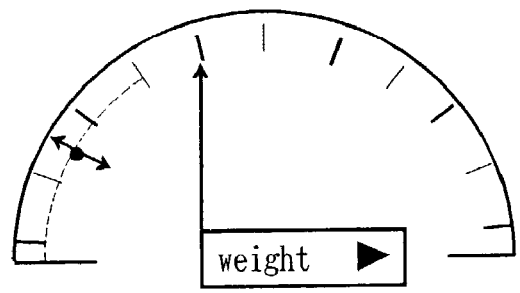

The length of each scale mark is, as shown in FIG. 16B, decided by the way that first putting a cursor on one edge of the displayed scale, then, moving the cursor in the longitudinal direction toward the periphery or the direction of the needle fixing point. Next, clicking the mouse on the scale to select one of the major tick mark among displayed thickness options: 1.0, 1.5, 2.0, 2.5, 3.0 sets the thickness of the major tick and the thickness of the minor tick mark automatically at the same time.

Color Setting of the Scale Marks

Figure 16C:
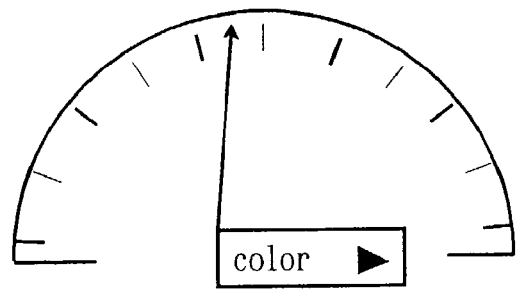

Further, as shown in FIG. 16C, the color of the scale marks is set by selecting color among color options displayed by clicking the scale.

Specifying the Typeface, Weight, Color of the Scale Markings

Figure 13:
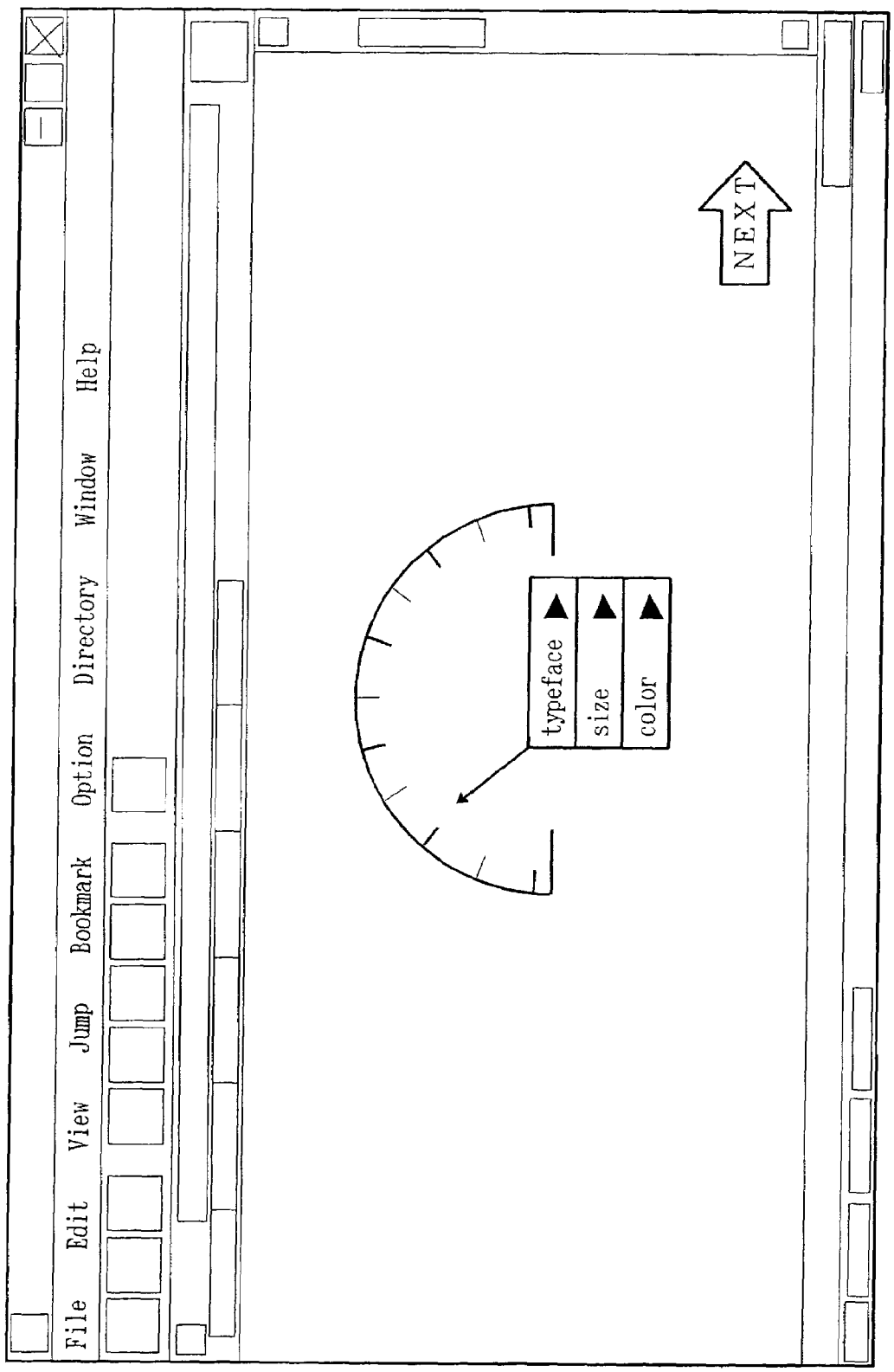
FIG. 13 is a personal computer screen in selecting a property of number of a scale plate of a combination meter.
Figure 16D:
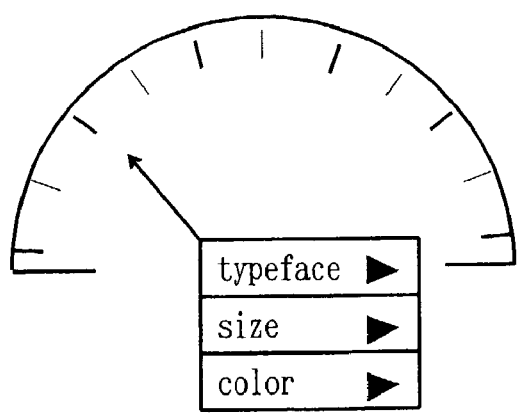

When clicking a position where a number may display on the scale, as shown in FIG. 16D, each number e.g. speed 0 to maximum speed 100 appears on the scale plate at prescribed intervals according to vehicle type. Next as shown in FIG. 13 or FIG. 16D, when the number near the tick mark is clicked, options of typeface, size and color which are properties of number characters appears. When every clicking an arrow displayed next to each option, the contents of the option changes. And when a desired option appears on the screen, clicking the option specifies the typeface, size and color of the number characters.

There are Gothic font, Ming-style font, POP font, input by hand and free captured materials, etc., in typefaces for number characters. Moreover, shading the specified typeface to add a three-dimensional impression is also available.

As shown in FIG. 17, a tachometer, a fuel gauge and a temperature gage are decided same as above.

After deciding each position and size of scale meters in a combination meter and properties of each scale plate as above mentioned, needle design is selected among A type to E type as shown in FIG. 18A and FIG. 18B. The needle design is classified into edge light illumination and irradiation illumination.

With respect to a method of selecting a needle, by first clicking a position of needle fixing position in a scale plate as shown in FIG. 18B, options of each needle are shown as an at-a-glance chart. Then, selecting a favorite needle from said options makes needle display on the clicked position. Alternatively as shown in FIG. 18B, clicking a favorite needle in the at-a-glance chart and dragging the needle to the needle fixing position in the scale plate is available.

After being created with above-mentioned process, image data of a customized combination meter is converted to animated image data. The animated image data is displayed on the screen to confirm the needle movement, needle illumination showing and scale plate illumination showing. As a result of a confirmation, if user is satisfied, the user-designed data is fixed. The user-designed data includes the above design of the customized meter and motion data. The user-designed data is sent to a dealer via internet.

The dealer derives the meter producing data from the user-designed data and sends the meter producing data to the meter manufacturing side via the carmaker.

Figure 19:
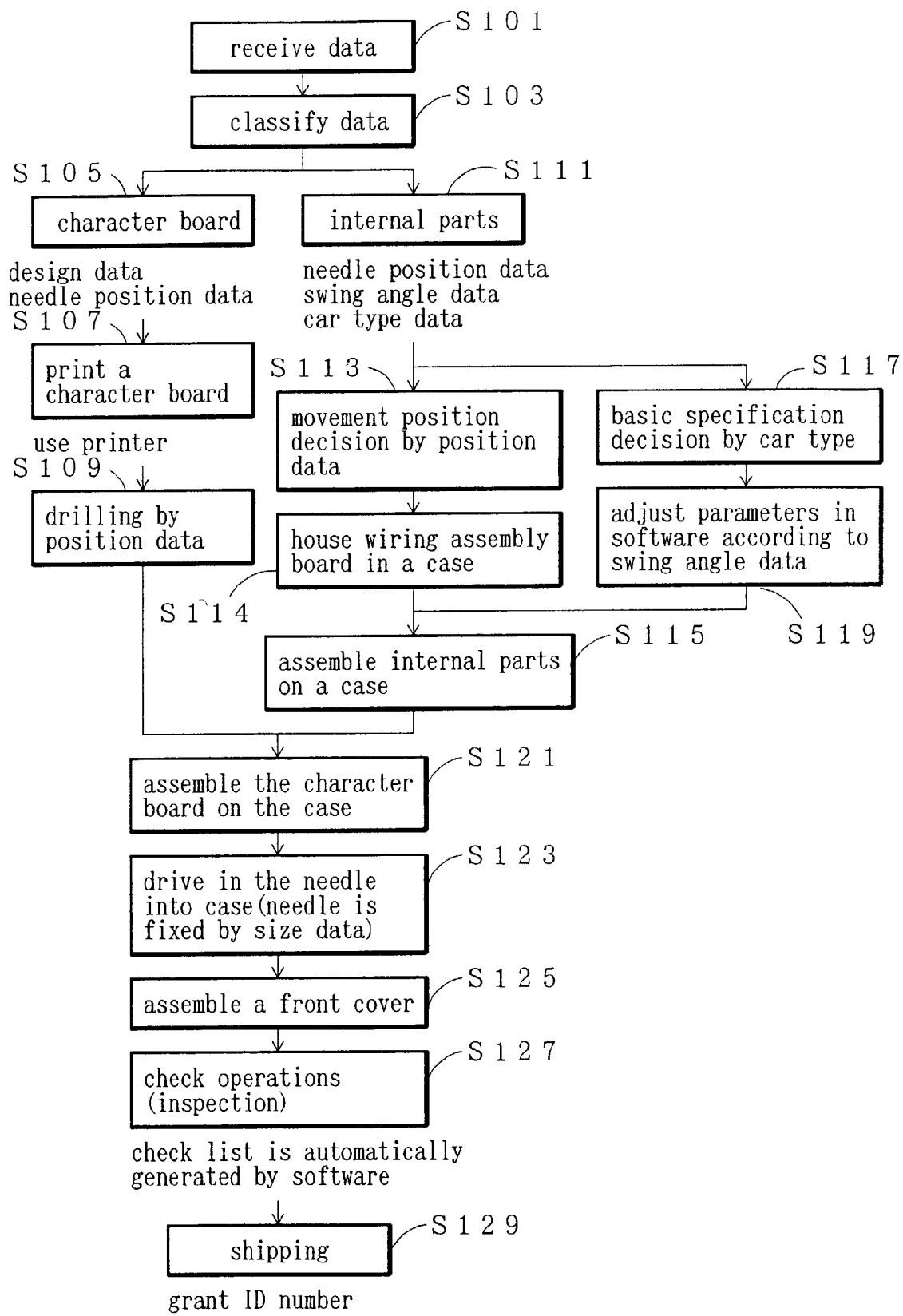
FIG. 19 is a process chart, showing a fabrication sequence of a customized meter.

The meter manufacturer side receives the meter manufacturing data (derived from the meter producing data) from the system as shown in FIG. 3. Then, the manufacturer side classifies the data into data for character board including needle position data, and data for internal parts including swing angle data, car type data, and needle position data as shown in FIG. 19 (Step S101, S103, S105, S111).

A printer prints background image digitally on the character board with classified design data based on the design data on the character board of the combination meter. The printer digitally prints scale plates of a speedometer, a tachometer, a fuel gauge, a temperature gauge, etc. on the character board in the color, length and weight of marks specified on each scale plate and the typeface, weight, color of the scale numbers (Step S107).

The meter manufacturer locates positions of holes for needle axes according to needle position data and drills holes on the character board (Step S109).

Next, positions of the movements such as speedometer, tachometer, fuel gauge, temperature gauge, etc., as internal parts on an after-mentioned matrix base substrate (wiring board) are determined based on needle position data. Next, by housing the wiring board in a case to fix it, internal parts are assembled into the case (Step S113, S114, and S115).

Because signal input forms to respective internal parts are different in vehicle types, basic specifications of the internal parts are decided according to vehicle type data in the beginning. Next, driving control data of each movement is modified by swing angle data and is stored in (after-described) memory. And based on above drive control data, CPU controls said movements. (Step S117, S119).

After assembling the wiring board where internal parts are arranged, the printed character board is assembled (Step S121). Previously holes for the needle axes are drilled on the printed character board. Cylindrical supports with predetermined forms for the needle axes are inserted into openings for the needle axes on the character board. Then, the axes of rotation are fitted into the internal parts respectively. Thus, the needle axes are fitted to the character board (Step S123).

After the needles are attached to the character board, a stared back face is attached to a surface of the character board. Then, a front face cover is attached to a case. Thus, the combination meter is assembled (Step S125). After assembling the meter, a verification test is carried out according to inspection items. The inspection items are automatically generated from driving control data of each movement based on basic specifications of the internal parts (Step S127).

If an operation is verified, an identification number is assigned to a customized meter. The customized meter is delivered to the carmaker. The carmaker installs the meter in a vehicle. The vehicle is delivered to the dealer. And the dealer delivers the vehicle to the user.

A method of mounting a matrix base substrate with movements is described below in detail.

Figure 20:
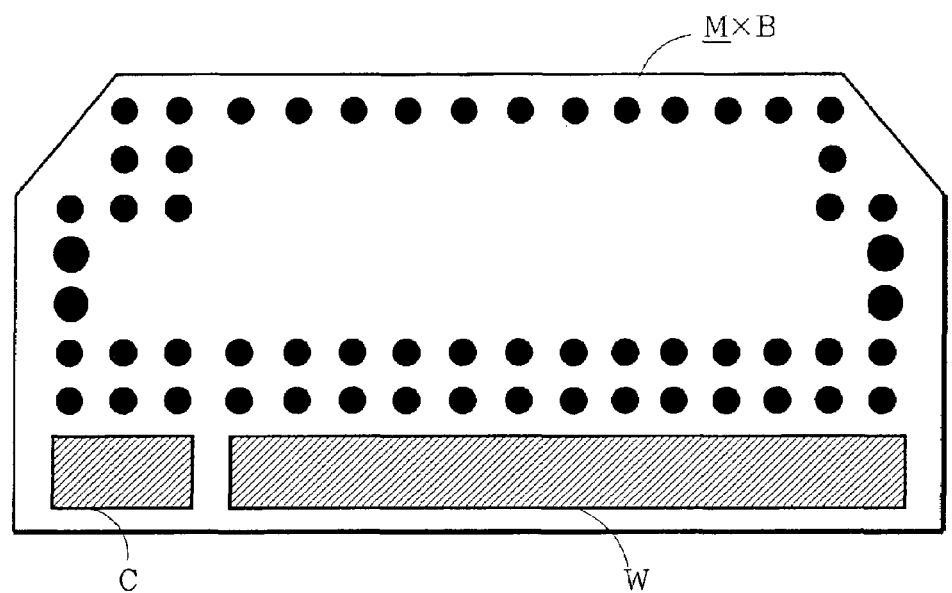
FIG. 20 is a drawing, showing a surface of a matrix base substrate according to one embodiment of the present invention.

FIG. 20 shows a matrix base substrate MxB as a standard where each movement available in the meter manufacturer is installed. A plurality of lands for assembling wires are formed at fixed intervals in a matrix shape on a surface of the substrate MxB. The area where lands are formed is available as a free area in order to design a character board.

A connector terminal C and a warning unit W are installed below the substrate MxB except the free area. The connector terminal C is connected to wires by a connector or connectors. The wires send control signals and power-supply to stepper motors and drivers. The stepper motors are elements of movements on after-mentioned movement substrates. The drivers are also arranged on the after-mentioned movement substrates. Various indicators for warning are placed on the warning unit W.

Figure 21:
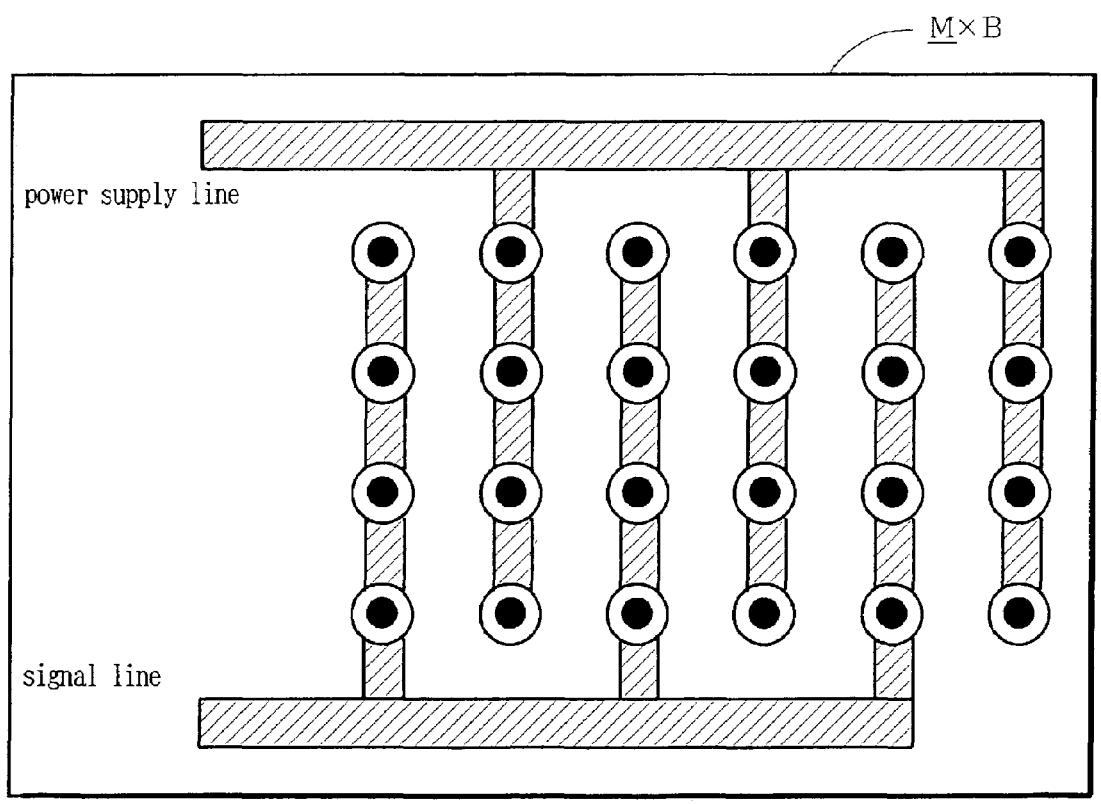
FIG. 21 is a drawing, showing a rear surface of a matrix base substrate according to one embodiment of the present invention.

Lands connected to lands on a front surface via through holes are formed on a backside surface of the substrate MxB. The lands on the backside surface are connected to printed wiring in a plurality of lands for a unit in a column direction as shown in FIG. 21. Lands on each odd number line are connected to printed wiring of a signal line, whereas lands on each even number line are connected to printed wiring of a power supply line. As a result, above printed wiring forms a pectinate pattern.

As shown in FIG. 22A, a movement assembly, installed on a matrix base substrate MxB surface, comprises a stepper motor SM, drivers, movement base substrate MB and an opening H1. The stepper motor SM and drivers (not shown) are fixed in a backside surface of the substrate MB. The substrate MB has openings at four corners in an interval of adjacent lands. An axis of rotation of the stepper motor SM is stuck out to a surface of the substrate MB through the opening H1. A needle N is stuck out to the stepper motor SM by fitting a cylindrical support N1 of the needle N into an axis of rotation PI.

The movement base substrate MB as a component of the movement assembly is, as shown in FIG. 22B, mounted through bosses suspended from the matrix base substrate MxB. In a case of connecting power supply terminals or signal inputs of the substrate MB to signal input terminals or lands of a power supply of the substrate MxB, the bosses are electrically conductive and screws screwing both bases together through bosses are electrically conductive as well. In a case that both bases are electrically isolated, both bosses and screws are insulators.

When each movement assembly is aligned at each scale plate position and installed on the free area of the substrate MxB with above constitution, a wiring surface WS of the substrate MxB is suspended a little above a bottom of a case CA. And the substrate MxB is housed in a case CA as shown in FIG. 23.

Figure 24:
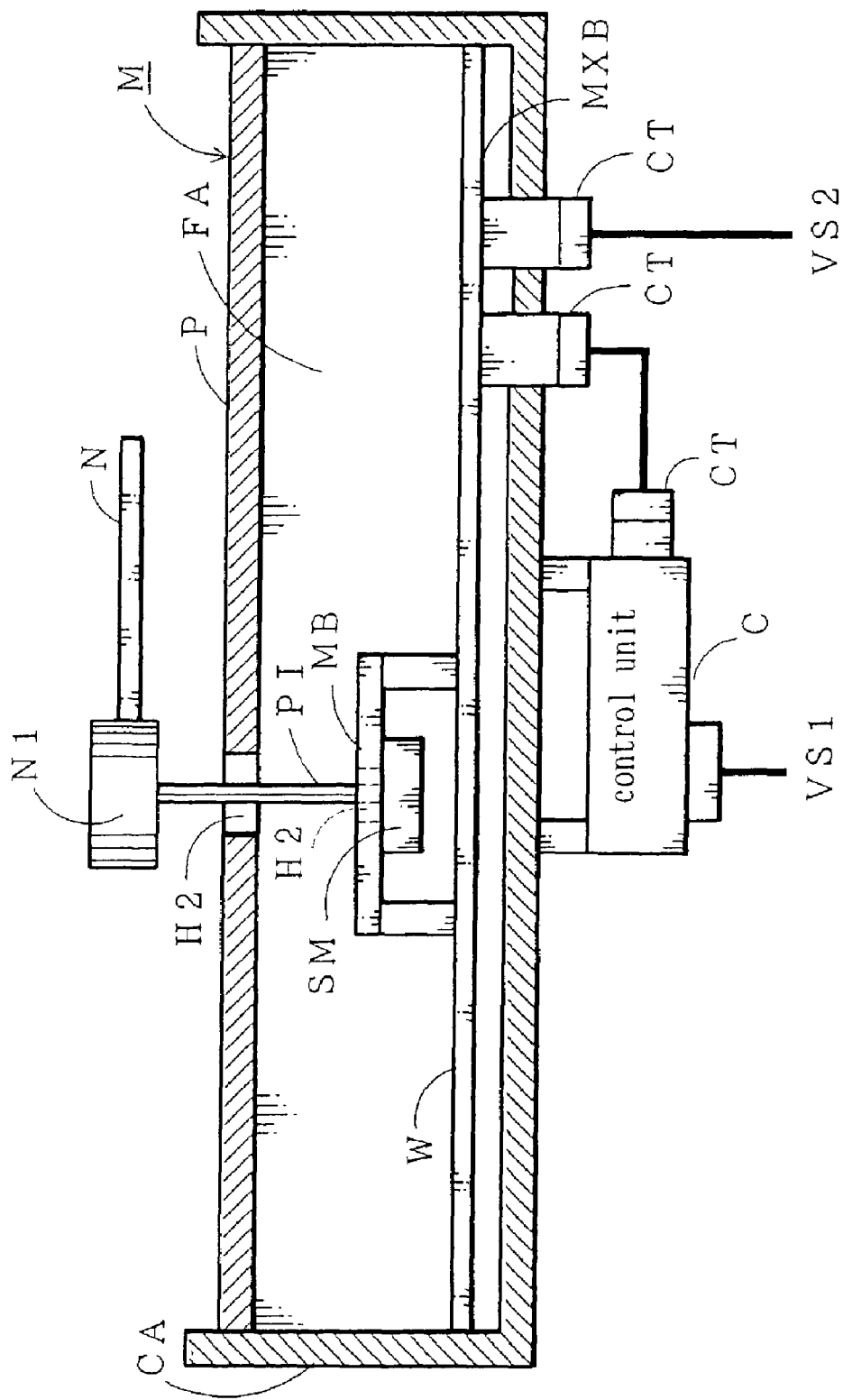
FIG. 24 is a cross sectional view, showing composition of a customized meter according to one embodiment of the present invention.

A control unit C is composed on a control base and fixed on a back surface of the case CA as shown in FIG. 24. The control unit C outputs driving signals according to vehicle signals VS1. The control unit C is connected to the wiring surface WS of the matrix base MxB through a connector CT by electric wires.

Further, a signal input unit corresponding to a warning unit W on the matrix base MxB is also connected through the connector CT to the wires. Vehicle signals VS2 of said warning unit is inputted via the wires.

Further, a character board P is engaged in a surface of the case CA. The each scale plate is printed on the board P. And a through-hole H2 is formed on the board P. The cylindrical support N1 of the needle N is fitted into the axis of rotation of the stepper motor SM. And the needle N is fitted into the stepper motor SM. Thus, the combination meter is assembled.

Figure 25:
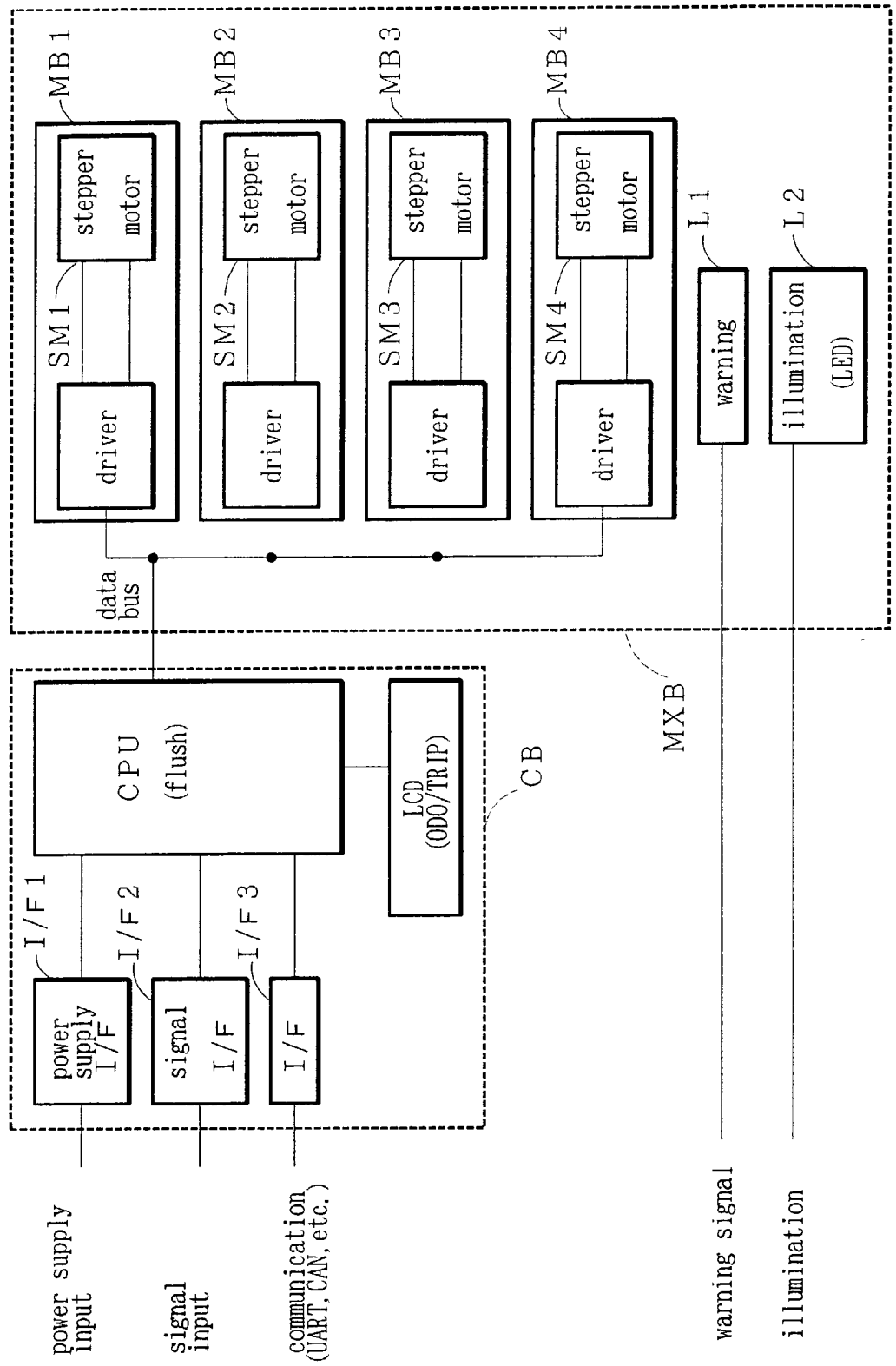
FIG. 25 is a block diagram, showing electric system of a customized meter according to one embodiment of the present invention.

FIG. 25 shows an electric system of a combination meter in one embodiment of the present invention. The movement assemblies of the meters, the warning display unit L1 and the LED unit L2 are placed on the matrix base substrate MxB. Said movement assemblies of the meters are composed of the driver and the stepper motor SM on the movement base substrate MB respectively. The warning display unit L1 is composed of such as LCDs. The LED unit L2 illuminates the character board.

A control base CB transmits signals for driving each movement according to vehicle signals to the matrix base MxB. The control base CB is provided with the CPU, a power-supply interface I/F1, a signal interface I/F2, a LAN interface I/F3. The CPU outputs driving control signals of movements according to vehicle signals, and drives odometers (ODD/TRIP) composed of Liquid Crystal Displays (LCDs, mounted on the matrix base substrate). The power supply interface I/F1 feeds power supply voltage into the CPU. The signal interface I/F2 inputs vehicle signals into the CPU. The LAN interface I/F3 inputs and outputs communication control signals for in-vehicle LAN. The control unit C is configured in this manner.

Driving control data of movements is generated when the meter producing data is created. And the driving control data is loaded into the CPU via the interface I/F3 when the customized meter is manufactured. The warning display unit L1 receives warning signals for the control of lighting and blinking the display according to various sensor outputs of the vehicle. The LED unit L2 illuminates the character board. The LED unit L2 receives an illumination start signal concurrently with an ignition switch on.

The combination meter is manufactured by arranging normalized movement assemblies as standards on the matrix base MxB as above described. Therefore, the combination meter designed by the user according to the user's voluntary idea can be manufactured without the need for each new designed printed wiring board. Therefore, the customized meter in large item small volume production can be manufactured at low cost and in a short period. Further, a combination of adopting digital printing technique for the character board and adopting assembling technique for internal parts on the matrix base substrate allows to improve the degree of freedom in combination meter design.

What is claimed is:

1. A system for manufacturing a customized meter comprising:
   a user-side meter designing section for designing a desired combination meter, said designing section displaying a combination meter, for designing by a user based on supplied meter designing data, on a display screen and generating combination meter producing data for the production of said combination meter designed by the user; and
   a combination meter manufacturing data processing section for supplying said meter designing data to said user-side meter designing section and sending out an order of manufacturing a combination meter to a manufacturer side by supplying combination meter manufacturing data, which manufacturing data is derived from said combination meter producing data generated at said user-side meter designing section based on said supplied meter designing data,
   wherein said user-side meter designing section generates the combination meter producing data designed at the user-side by determining an arrangement of various meters and a size of each meter based on the meter designing data upon receiving said meter designing data from said meter manufacturing data processing section, which designing data allows combination meter designing within an area of installation of a combination meter on a substrate for assembling a combination meter at said manufacturer side, and sends back the combination meter producing data to said meter manufacturing data processing section, and said meter manufacturing data processing section automatically sends out an order of manufacturing the combination meter to the manufacturer side via the Internet by deriving the combination meter manufacturing data from meter drafting data after deciphering the combination meter producing data which is sent back from the user-side and generating the meter drafting data according to the deciphering result.

2. The system as claimed in claim 1, wherein said meter manufacturing data processing section provides said user-side meter designing section with said meter designing data by including a plurality of design data, needle drive data and meter drive simulation data based thereon for imaging the combination meter.

3. The system as claimed in claim 1, wherein according to said meter designing data supplied from said data processing section, said user-side meter designing section displays images of a plurality of design data and indicator drive data as options for a user to select on the display screen, displays, thereafter, image data of a combination meter in a combination of data selected therefrom and, changes colors of moving needles or indicator panels of the combination meter displayed on the display screen with colors selected by said user according to meter drive simulation data.

4. The system as claimed in claim 1 or claim 3, wherein said user-side meter designing section generates the meter producing data from a combination meter displayed on the display screen and a meter drive simulation result, and sends back the meter producing data to said data processing section, and said data processing section automatically sends out the order of manufacturing the combination meter to the manufacturer side by deriving the meter manufacturing data from returned meter producing data, which manufacturing data includes design elements of combination meter design, parts data for specifying each part, needles drive data for CPU drive control and display units light data.

5. The system as claimed in claim 1, wherein a main substrate on which a combination meter is assembled in said manufacturer side has a plurality of lands on a surface thereof at specified space intervals by matrix figure where meter components are attached, auxiliary substrates for mounting meter movements on which electric wiring materials are arranged in accordance with an interval of said lands, are mounted on said main substrate in accordance with each predetermined meter arrangement, and various display units are arranged on said main substrate.

6. The system as claimed in claim 5, wherein said main substrate comprises a control unit for storing both the needles drive data and the display units light data and including CPU which controls said movements and display units based on data stored in said control unit.

* * * * *